United States Patent [19]

[11] 3,720,848

Schmidt, Jr.

[45] March 13, 1973

[54] SOLID-STATE RELAY

[75] Inventor: Bernard H. Schmidt, Jr., Mesa, Ariz.

[73] Assignee: Motorola, Inc., Franklin Park, Ill.

[22] Filed: July 1, 1971

[21] Appl. No.: 158,761

[52] U.S. Cl. ..........................307/251, 235/22.2 UX

[51] Int. Cl. ..........................................H03k 17/00

[58] Field of Search .......307/255, 304, 251; 317/235

[56] References Cited

UNITED STATES PATENTS

| | | | |
|---|---|---|---|
| 3,512,012 | 4/1970 | Kosowsky et al. | 307/304 X |
| 3,457,435 | 7/1969 | Burns et al. | 307/251 |
| 3,466,511 | 9/1969 | Lin | 317/235 |
| 3,588,540 | 6/1971 | Bohn | 307/251 |
| 3,609,414 | 9/1971 | Pleshko | 317/235 |
| 3,390,314 | 6/1968 | Medwin | 317/235 |
| 3,406,298 | 10/1968 | Axelrod | 307/251 |
| 3,444,397 | 5/1969 | Lym | 307/304 X |
| 3,513,405 | 5/1970 | Carlson | 317/235 |
| 3,621,286 | 11/1971 | Varrasso | 307/251 X |

OTHER PUBLICATIONS

"Integrated Electronics, Toward Mos Memories," Electronics Review, Vol. 41, No. 22, (Oct. 28, 1968) at 49–50.

*Primary Examiner*—H. K. Saalbach
*Assistant Examiner*—R. E. Hart
*Attorney*—Mueller & Aichele

[57] ABSTRACT

There is disclosed an improved solid-state relay comprising a C-MOS analog switch or transmission gate in which the change in input-output resistance for variations in the input signal is minimized by maintaining the substrate of the N-channel device at the same potential as that of the source of the N-channel device. The N-channel substrate provision source are maintained at the same potential by the privision of an additional P-MOS device located on the same integrated circuit chip in which the additional P-MOS device is rendered conductive during that period of time which the switch is in its conducting mode.

13 Claims, 10 Drawing Figures

INVENTOR.
Bernard H. Schmidt Jr.
BY
Mueller & Aichele
ATTY'S.

INVENTOR
Bernard H. Schmidt Jr.
BY Mueller & Aichele
ATTY'S.

INVENTOR.
Bernard H. Schmidt Jr.
BY
Mueller & Aichele
ATTY'S.

INVENTOR
Bernard H. Schmidt Jr.
BY Mueller & Aichele
ATTY'S.

SOLID-STATE RELAY

BACKGROUND OF THE INVENTION

This invention relates to solid-state relays, and more particularly to complementary metal oxide semiconductor (C-MOS) devices used as analog switches known as transmission gates.

C-MOS analog switches or transmission gates are devices having complementary P-channel and N-channel elements whose sources and drains are connected and parallel, with the input to the device being to one pair of commonly connected sources and drains and the output being at the other pair of commonly connected sources and drains. The solid-state switch formed by the use of complementary MOS devices functions as a high speed switch or relay operating in the nanosecond range. The switch is rendered conducting by the application of oppositely polarized gate signals to the gate terminals of the complementary MOS devices. As such, these devices function as solid-state relays which find application both in analog and digital multiplexing and demultiplexing circuits as well as in digital to analog conversion applications because of their high "off" resistances. One common multiplexing system for which the solid-state relay has application is the aircraft-in-flight data acquisition systems or in the remote data terminals used for decoding information required at remote points on the aircraft.

There is, however, a requirement that the switched information be unaltered through the switch. This is to say that the output voltage levels at the output terminal of the switches must be equal to or linearly proportional to the input voltage levels. This is not a problem with the slower relays because the resistance from the input to the output of a relay is negligible once the reeds of the relay have made contact. However, in MOS analog switches, the input-output resistance is non-linear and varies with the input voltage to the solid-state relay. This non-linearity of resistance across the MOS device has been found to be due to a source-substrate bias effect. The source-substrate bias effect is due to an inherent reverse biasing voltage applied to the substrate of the MOS device through carriers travelling in the body thereof. This bias voltage is referred to herein as $V_{s\text{-}sub}$ and is the voltage differential between the source of the particular MOS device and its substrate. This reverse biasing voltage is dependent on the input signal and affects the MOS device by causing gate threshold voltage variations with variations in the amplitude of the input signal to the device.

The variation in the gating threshold for the MOS device causes a non-linear resistance across the device which varies with the input voltage. Thus, conventional MOS devices cause a certain "distortion" of the input signal due to this non-linear variation in resistance across the device. When information delivered by certain of the transmission lines to a multiplexing circuit is switched by this circuit, the amplitude of these signals at the output of the multiplexing circuit may or may not correspond to the voltage at the input. It is therefore the accuracy of the transmission through the solid-state relay which is in question when using the conventional MOS analog switches. This can be very critical when the information carried to the solid-state relay is in the form of a voltage level. Taking, for instance, the sensing of a temperature in the engine of an aircraft and representing this temperature as a voltage level, if the voltage level is at the extremes of the operating range of the solid-state relay, then there may be very little attenuation of this voltage due to the internal resistance of the solid-state relay. If, however, the voltage level is very low or close to zero, a large input-output resistance for the switch will cause this voltage to be "distorted" into a false voltage at the output of the solid-state relay. This "distortion" has caused the rejection of the use of solid-state relays in many aircraft multiplexing circuits since the voltage error through the solid-state relay cannot easily be ascertained due to its non-linearity.

While it will be appreciated that the conventional C-MOS analog switching devices are fast and have a common mode range equal to the voltage differential between the opposite polaritied gate voltages to the devices, it will be appreciated that these devices cannot be used in their present form because of the "distortion" of the signals switched therethrough. It will be further appreciated that each of these conventional C-MOS analog switching devices has a P-channel device in parallel with an N-channel device. In the "on" condition, the conventional device has an input-output resistance composed of the parallel connected resistances of both devices. The total or composite parallel resistance, unfortunately, changes with changes in the input voltage to the switch which causes the aforementioned "distortion" of the input signal.

The subject circuit minimizes this "distortion" by minimizing the change in resistance across the switch for changes in input voltage. When the conventional devices are fabricated in integrated circuit form, it is the N-channel device which is the major contributor to the distortion mentioned before, because of its sensitivity to variations in the input voltage, $V_{in}$. The sensitivity of the N-channel device is oftentimes 3 times the sensitivity of the P-channel device to variations in the input voltage. The purpose, therefore, of the subject improvement is in reducing the N-channel sensitivity to variations in the input voltage $V_{in}$. To accomplish this reduction in sensitivity, the substrate of the N-channel device is tied to the source of the N-channel device by an auxiliary P-channel device whenever the C-MOS switch is rendered conductive. This eliminates the aforementioned source-substrate bias affect by maintaining the potential between the substrate and the source of the N-channel device equal to zero. This $V_{s\text{-}sub} = 0$ condition results in a relatively flat resistance characteristic of the N-channel device (and thus the entire switch) with respect to analog input voltages running the whole operating range of the device.

What has been accomplished by keeping $V_{s\text{-}sub} = 0$ for the N-channel device is to reduce the high rate of change of N-channel resistance, $R_N$, with respect to an input voltage change. The sensitivity of the N-channel resistivity to changes in input voltage is reduced by causing the N-channel device to work on the flatter and lower portion of the N-channel resistance curve. Since the N-channel device is in parallel with the less sensitive P-channel device, the combined paralleled resistance of the switch varies much less with variations in the incoming input signal. Thus, the "distortion" of the input signal by the switch is much less utilizing the subject technique.

More specifically, the N-channel sensitivity is a problem when making integrated circuit C-MOS devices. This is because of the N-channel device substrate doping, which is higher than the substrate used for the P-channel device. Thus, the N-channel sensitivity to input voltage changes causes much of the "distortion" when used in combination with the less sensitive P-channel counterpart in a standard C-MOS package. The N-channel sensitivity is lessened by minimizing the gate threshold, $V_T$, sensitivity to input voltage variation.

The causes of the N-channel sensitivity are as follows: It will be appreciated that $R_N \propto 1/V_{sg_n} - V_{T_n}$. Where $V_{sg_n}$ is the potential voltage differential between the source of the N-channel device and its gate. Here $V_{T_n}$ is the gate threshold voltage at which the N-channel device is rendered conductive. However, $V_{T_n} \propto \sqrt{V_{s-sub_n}}$. By reducing $V_{s-sub_n}$ to 0, the sensitivity of $V_{T_n}$ to input voltage variations is minimized. If $V_{T_n}$ sensitivity is minimized, it will be appreciated that $R_N$ sensitivity is likewise minimized. Further, the $V_T$ sensitivity is a function of $V_{s\text{-}sub}$ where $V_s = V_{in}$ for high load impedances. Therefore, by connecting the N-channel substrate to the N-channel source, the potential difference between the source and substrate goes to zero, thereby eliminating any bias voltage differential between source and substrate which heretofore has caused the N-channel sensitivity. Thus, the $V_T$ term will not vary appreciably with input voltage, $V_{in}$. If the $V_T$ term does not vary, $R_N$ will not be as sensitive to input voltage swings since it will be proportional to only $1/\Delta V_{sg_n}$ rather than $1/\Delta V_{sg_n} - \Delta T_n$. Coupling the lower sensitivity N-channel device in parallel with the less sensitive P-channel device now results in an almost flat resistance characteristic for the entire switch. Further it is flattest at the center of the operating range of the switch, thus providing even less "distortion" to the low level input signals centering around zero volts, where high "distortion" would normally swamp the low level input signal.

In comparison to the prior art, solid-state analog switching devices, the resistance change over the entire input range of the subject device is only 19 percent versus 100 percent resistance changes where the P-MOS device is utilized alone and compared with an approximate 480 percent resistance change for the standard C-MOS analog switches.

SUMMARY OF THE INVENTION

It is therefore an object of this invention to provide an improved analog switching device.

It is a further object of this invention to provide an improved analog switching device comprising complementary metal oxide semiconductors in integrated circuit form in which the switching device has a decreased resistance sensitivity to input signal amplitude.

It is a further object of this invention to provide an improved C-MOS transmission gate with the N-channel device resistance being made less sensitive to the input signal voltage level.

It is yet another object of this invention to provide an improved analog switch including parallel connected complementary metal oxide semiconductor devices with a substrate potential of the N-channel device being clamped to the source potential of the N-channel device when the entire switching device is rendered conducting by the simultaneous application of opposite polarity gating signals to the gates of the devices.

It is yet another object of this invention to utilize an additional P-channel device connected between the substrate and source of an N-channel device for lowering the sensitivity of the N-channel device to input voltage changes, which additional P-channel device prevents leakage between the source and drain of the N-channel device when the switch comprised of a P-channel device and this N-channel device connected in parallel is in an "off" condition.

It is yet a still further object of this invention to provide a distortion-free C-MOS analog switch with nanosecond switching times and a common mode range equal to the voltage differential between the gating voltages necessary to simultaneously render the two channels of the C-MOS switching device conducting.

BRIEF DESCRIPTION OF THE INVENTION

There is provided a C-MOS analog switch whose function is to connect information in a first transmission line to a second transmission line without distortion which switch has an operating range in which the input voltage amplitude range is equal to the difference between the gating thresholds of the C-MOS device. More particularly there is provided an improved solid-state relay comprising a C-MOS analog switch or transmission gate in which the change in input-output resistance for variations in the input signal is minimized by maintaining the substrate of the N-channel device at the same potential as that of the source of the N-channel device. The N-channel substrate and source are maintained at the same potential by the provision of an additional P-MOS device located on the same integrated circuit chip in which the additional P-MOS device is rendered conductive during that period of time which the switch is in its conducting mode.

DETAILED DESCRIPTION OF THE INVENTION

Figure 1:
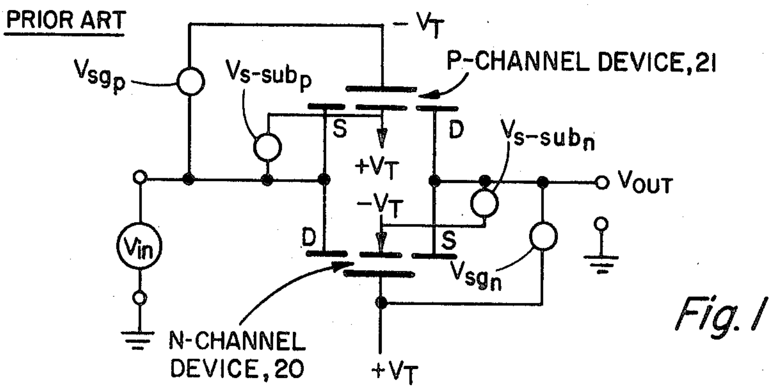
FIG. 1 is a schematic diagram showing a standard C-MOS analog switch in which the complementary devices are coupled in parallel.
Figure 4:
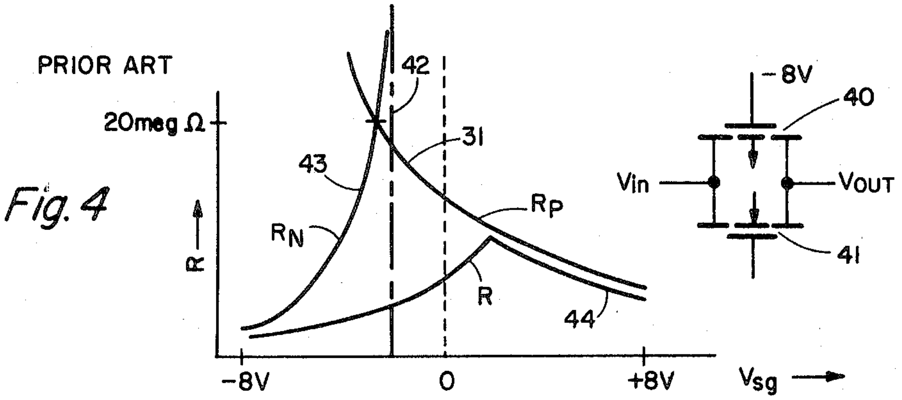
FIG. 4 is a graph showing the input-output resistance as a function of input voltage for both halves of the prior art C-MOS analog switch shown in FIG. 1, also showing the composite input-output resistance across the device.

The existing C-MOS analog switching structure is shown in FIG. 4 of the patent of J. R. Burns et al. issued July 22, 1969, as U. S. Pat. No. 3,457,435. It will be appreciated that the N-channel and P-channel devices to be discussed hereinafter and throughout this description are enhancement mode devices which are normally in an "off" condition until turned on by a voltage applied simultaneously to the gates of the two devices. It will further be appreciated that in the normal operation of a complementary C-MOS analog switch having sources and drains connected in parallel, the substrate of each of these devices is normally biased at a voltage equal to the gate voltage of the particular device but of opposite polarity. This substrate biasing is not shown in the Burns et al. patent but is now common practice in the operation of the C-MOS analog switching devices. It will be appreciated that it is a feature of this invention that the normal bias voltage applied to the substrate of the N-channel device is removed and that this bias is provided by the aforementioned additional P-channel device. It will be further appreciated that enhancement mode devices are now depicted schematically as having interrupted substrates as shown in FIG. 1 to distinguish them from depletion mode devices which are normally in an "on" condition and to which a gating signal must be applied to render them non-conductive. A further convention to be noted as shown in FIG. 1 is the labeling of the source and drain elements in the P-channel and N-channel devices. As can be seen from FIG. 1, the input signal $V_{in}$ is coupled in parallel to the source of the P-channel device and the drain of the N-channel device. The output voltage, $V_{out}$, is taken from the drain of the P-channel device and the source of the N-channel device. Since metal oxide semiconductors are basically symmetrical, this nomenclature is somewhat arbitrary, but will be referred to consistently throughout this discussion in the above manner.

Further definitions relate to the voltages to be described hereinafter. The potential difference between the input signal and the gate is labeled $V_{sg_p}$ for the P-channel device and refers to the voltage differential between the source of the P-channel device and its gate. The source to gate voltage of the N-channel device is designated $V_{sg_n}$ and is taken between the output of the device and the gate to the N-channel device. It will be appreciated that when the switching device is in its "on" condition, assuming a high impedance load at the output (which is usual since these devices are usually coupled to operational amplifiers) that the input voltage will equal the output voltage to a first approximation. The potential difference between the source and the substrate is shown as $V_{-sub_p}$ for the P-channel device and $V_{s-sub_n}$ for the N-channel device. The gating voltage for the P-channel device is shown by a $-V_T$ and the gating voltage for the N-channel device is indicated by $V_T$.

Figure 2:
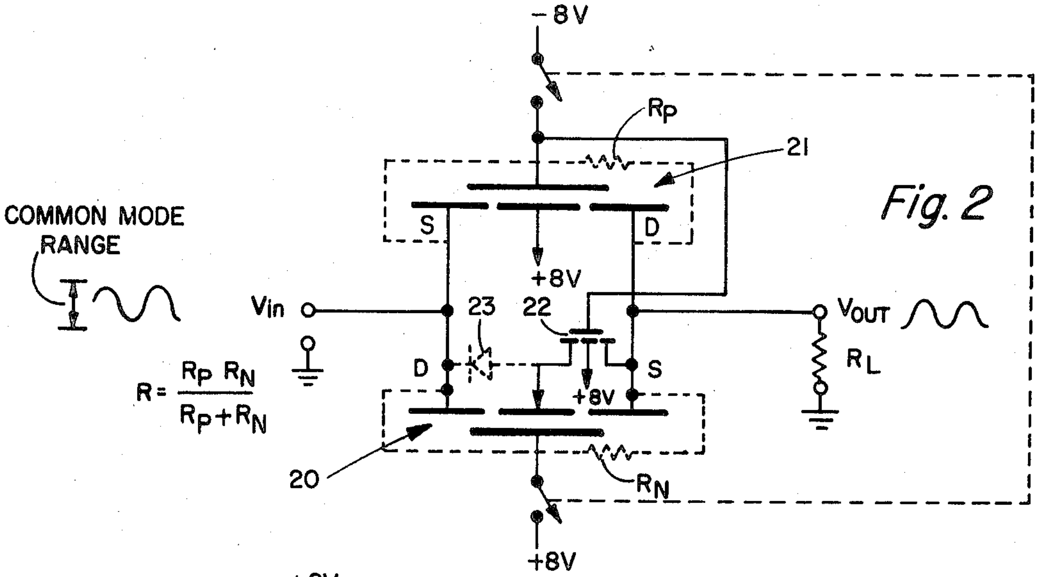
FIG. 2 is a schematic diagram of the subject C-MOS analog switch showing the connection of the substrate of the N-channel device to the source of the N-channel device via an additional P-channel device whose gate is coupled in parallel with the gate of the original P-channel device to a gating signal.

The basic function of the circuit shown in FIG. 1 is as follows with respect to an analog input signal. When the analog input signal, $V_{in}$, goes from a positive input potential to a negative potential, the effect on the P-channel device is to increase the resistance thereacross while the effect on the N-channel device is to decrease the resistance across it. However, in a standard C-MOS transmission gate, the increase in resistance in the P-channel device is much less rapid than the decrease of the resistance in the N-channel device resulting in the aforementioned sensitivity of the N-channel device to changes or variations in the input signal. The devices depicted in FIGS. 1 and 2 are enhancement mode devices which must be turned "on" by the application of a gate potential. When the gate-source potentials, $V_{sg}$, of both the P- and the N-channel type devices are less than their respective threshold voltages, $V_T$, the switches are in their respective open circuit conditions with an input-output resistance in the $10^{12}$ ohm range. This "off" resistance results from reverse biased semiconductor junction currents. The device threshold voltage, $V_T$, is defined as the gate-to-source potential, $V_{sg}$, necessary to produce a strong surface inversion layer for the conducting channel. For $V_{sg}>V_T$, the switch is in the "on" state and the input-output resistance, R, can be reduced to the 100 ohm range. By varying the gate bias potentials and using different device geometries, the input-output "on" resistance of the switch, R, can be easily designed to by anywhere within the 100 to 100 K ohm range.

OPERATION OF A C-MOS ANALOG SWITCH

The operation of the analog switch in the "on" or low resistance region can be described by referring to the following formula for the resistance of each channel of the C-MOS switch:

$$R_{n,\,p}=\frac{1}{\frac{\mu E_{ox}Z_p}{T_{ox}L_{eff}}\left[V_{sg_{n,\,p}}-V_{T_{n,\,p}}\right]} \quad (1)$$

where $$V_{T_{n,\,p}}=V_{To}+K\left[\sqrt{V_{s-sub_{n,\,p}}+2\phi_F}-2\phi_F\right] \quad (2)$$

Here $\mu$, $E_{ox}$, $T_{ox}$, $Z_p$, $L_{eff}$, $\phi_F$ and $V_{To}$ are pyysical device parameters.

$\mu$ ≡ majority carrier mobility
$E_{ox}$ ≡ permitivity of gate dielectric
$T_{ox}$ ≡ gate dielectric thickness
$Z_p$ ≡ MOS conduction channel width
$L_{eff}$ ≡ MOS conduction channel length
$\phi_F$ ≡ Fermi potential of the bulk silicon
$V_{To}$ ≡ device threshold voltage for $V_{s-sub}=0$ Since the switch is composed of a P-channel device having a channel resistance $R_p$ and an N-channel device having a channel resistance $R_N$, the input-output resistance when these two halves of the switch are connected in parallel is $R=R_PR_N/R_P+R_N$ when the switch is "on." If the gate voltage which renders the switch conducting is ± 8 volts and with an input voltage of +8 volts, the P-channel device has a 16-volt source-to-gate potential difference, $V_{sg_p}$, and a zero source-to-substrate potential $V_{s-sub_p}$. Thus the P-type device is biased "on" hard and has a low $R_p$. The N-channel structure is however biased "off" since $V_{sg_n}$ is less than $V_{T_n}$ and since $V_{s\text{-}sub}$ 32 16v. As the input voltage is increased towards the −8 volt level, the source-to-substrate potential of the P-channel device, $V_{s-sub_p}$, increases thereby increasing $R_p$. $R_N$ on the other hand is decreasing because of the larger $V_{sg_n}$ values and the smaller $V_{s\text{-}sub_n}$ values. Thus the "on" resistance through the whole device is a function of the shared resistance of both halves of the device as it responds to differing input signals. It will be appreciated that when $V_{s-sub_n}$ is high, then the resistance $R_N$ is high. As shown in FIG. 2 by clamping the substrate of the N-channel device to its source, $V_{s-sub_n}$ can be made 0, thus decreasing the overall resistance, $R_N$, of the N-channel device. This reduction is due to reducing the $V_{s-sub_n}$ term of equation 2 to zero which results in equation (1) being $R_N \propto 1/V_{sg_n}$.

It will be appreciated that shorting the P-channel substrate to its source also results in the overall resistance of the P-channel device $R_P$ being decreased. It is then possible to remove completely the affects of the $V_T$ term in equation (1) such that $R \propto 1/V_{sg}$ alone. Since the sensitivity of the P-channel device is not as great as the N-channel device to input voltage change, it is only the N-channel device which is usually provided with an additional or auxiliary source-to-substrate shorting means. However both the P-channel and N-channel. devices may be simultaneously provided with source-substrate shorting means to even further improve on distortion rejection of the analog switch.

As shown in FIG. 2, an additional P-channel device is connected between the source of the N-channel device and its substrate. The question oftentimes arises as to the necessity for providing a switching device so as to connect the substrate of the N-channel device to its source. The P-channel device is necessary in order to provide electrical isolation between the drain of the N-channel device and its substrate. It will be appreciated that the N-channel device has a diode characteristic between the drain and the portion of the substrate contacted as shown by the reference character 23. The diode 23 would act as a half-wave rectifier for signals at the input of the device if the N-channel substrate were directly connected to the N-channel source during the switch's "off" condition. At least one-half of the input signal would thus be shunted directly to the source or output side of the N-channel device during the switch's "off" condition, thereby rendering the switch partially conductive in its "off" condition. In addition, when the switches are arrayed in a multiplexing scheme, the outputs of the switches are interconnected. An output voltage of another switch could conceivably forward bias the diode 23 such that the drain of the N-channel device could be coupled to the source of the N-channel device even though the device would be technically in its "off" condition. To eliminate this possibility, a P-channel device is used to connect the substrate of the N-channel device to its source only during such time as the switch is rendered conductive by the appropriate gate signals being applied to the appropriate gates of the N-channel and P-channel devices 20 and 21. This device is shown in FIG. 2 at 22. Its substrate, as is the substrate of the P-channel device 21, is biased at +8 volts, the −8 gate voltage being applied to each of these devices in parallel whenever the switch is to be rendered conductive.

The provision of shorting the N-channel substrate to the source not only lowers the "on" resistance of the N-channel device, but also causes the N-channel device to operate on a flatter portion of its resistance curve, thus establishing a lower variation in the value for $R_N$ as a function of input voltage than would normally be possible.

GRAPHICAL EXPLANATION OF DEVICE OPERATION

A more complete explanation of the operating characteristics of the enhancement mode devices shown in FIGS. 1 and 2 are shown by way of illustration in graphs 3, 4 and 5.

Figure 3:
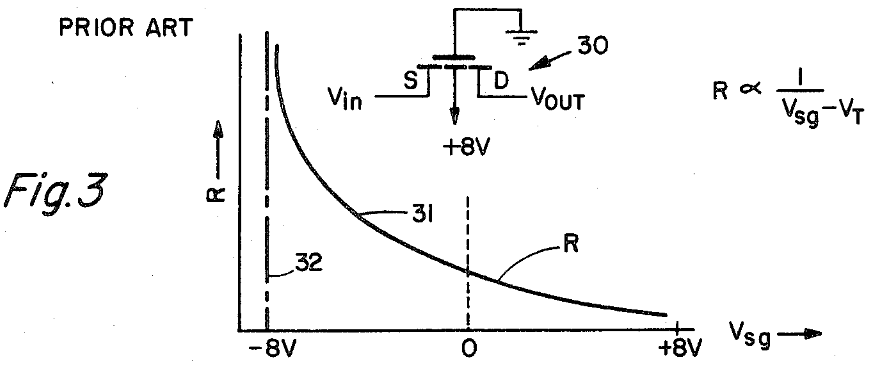
PRIOR ART Fig. 3
FIG. 3 is the graph showing the input-output resistance characteristic as a function of input voltage of a conventional single MOS device showing the non-linearity thereof.

Taking, for example, a single metal oxide semi-conductor device 30, it will be appreciated that the input-output resistance of the device varies as shown by the formula to the right of this graph as a function of $V_{sg}$ and $V_T$. As can be seen from the graph in FIG. 3, the resistance R across the device is a non-linear function. It is this non-linear function which results in as much as a decade of resistance change over the operating range of the device. The operating range of the device is shown to be limited by plus and minus the gate threshold voltage which, in this case, is plus and minus 8 volts. It will be noted that if this is a P-channel device, the resistance curve 31 approaches an asymptote shown by dashed line 32. The decade of resistance change over the operating range of the device can be from 1 K ohms to 10 K ohms. In addition to the large change of resistance over the operating range of the device is the problem that in a single P-channel device there is typically a 20- to 25-volt gating signal necessary to pass a 4- to 5-volt analog signal. Thus when using a single MOS device, two power supply potentials are necessary.

In order to solve the problem of the high gate potential with respect to the analog signal level, complementary MOS devices shown to the right of FIG. 4 at 40 and 41 are connected in parallel. This results in the analog signal range equalling the voltage difference between that necessary to turn on the P-channel device and that necessary to turn on the N-channel device. As shown here, an analog signal having swings in amplitude from its most positive to its most negative points equal to 16 volts can be handled by the conventional C-MOS analog switch with the gate thresholds being equal to ±8 volts. If the gating thresholds are made ± 15 volts then the analog input swing could be as much as 30 volts. The 30-volt input swing is however the maximum swing that can be accommodated by the subject device because an input-to-substrate reverse bias above 30 volts carried by the input signal normally causes avalanche breakdown in the device. This parallel connected C-MOS configuration is commonly called a "-transmission gate" configuration and its main or primary advantage is that the switch can transfer analog voltages up to the applied voltages on the gates of the device.

Figure 7:
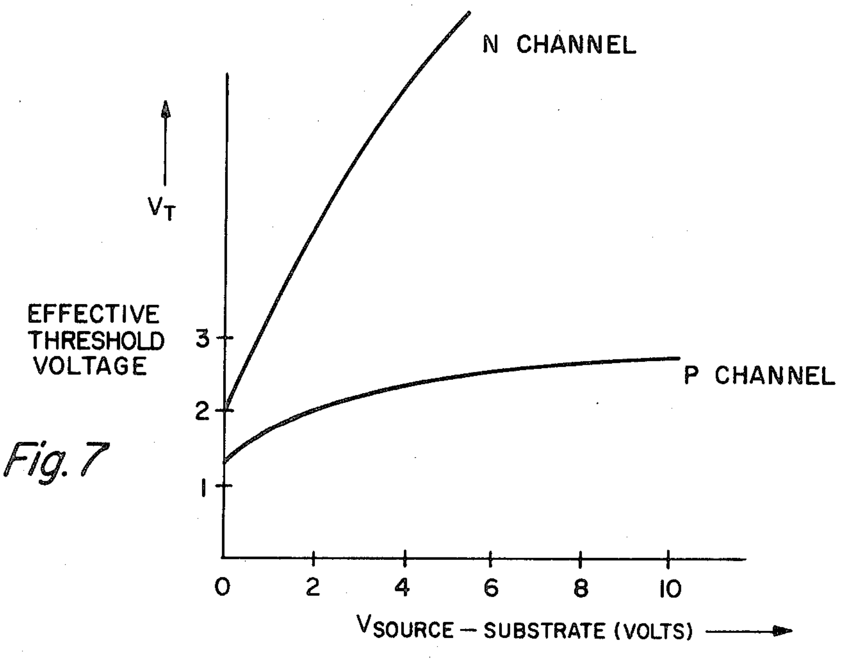
FIG. 7 is a graph showing the change in the effect of threshold voltages of N-channel and P-channel devices as a function of the source-substrate voltage differential, $V_{s\text{-}sub}$.

The problem with the transmission gate device just described is that it does not have a linear resistance characteristic, especially about the zero voltage input level which is precisely the place at which a good analog switch must be the most linear. This is because small signal inputs are most susceptible to distortion about their zero crossover point. As can be seen from FIG. 4, the resistance change across the N-channel device with a changing input voltage is about 3 times that of the P-channel device with the result that the N-channel device turns "off" at an input voltage $V_{sg}$ corresponding to asymptote line 42. It will be appreciated that the resistance across each channel of the device is proportional to $1/V_{sg}-V_T$. However, as can be seen from equation (1) $V_T$ is also function of the input voltage. It will be appreciated that in this formula, K for the N-channel device is approximately 3.0 while for the P-channel device is approximately 1.0. This constant, K, which derives its value from the doping concentration of the channel and the gate dielectric thickness is what accounts for the aforementioned sensitivity of the N-channel device to changes in the input voltage. The affect of this constant is shown in FIG. 7 where $V_T$ is graphed against $V_{s\text{-}sub}$. Thus $V_T \propto V_{s-sub}$ where the constant of proportionality, K, for the N-type device is 3 times as large as that for the P-type device. By eliminating the affect of $V_T$ on R at least insofar as the N-channel device is concerned (by shorting the N-channel substrate to its base) the non-linearity of the analog switch as a whole is significantly reduced.

Figure 5:
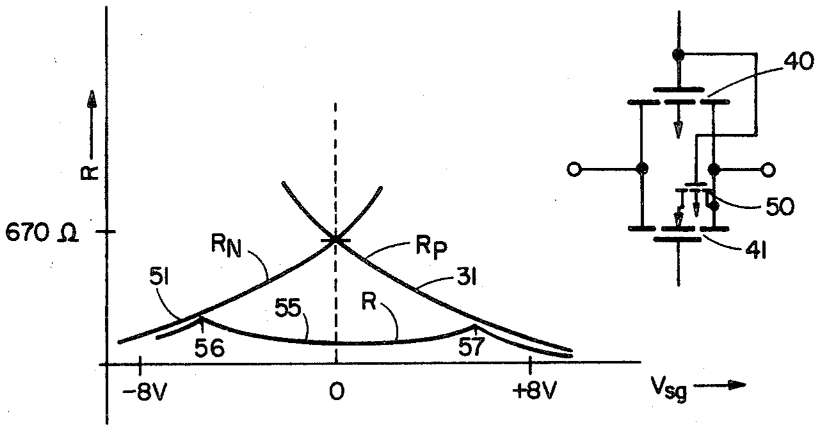
FIG. 5 is a graph showing the input-output resistances of both halves of the subject device as a function of input voltage as well as the composite input-output resistance as a function of the same input voltage.

Before referring to FIG. 5, it should be noted in FIG. 4 that the $R_N$ and $R_P$ resistance curves overlap at those portions of both curves which are rising the fastest. Therefore, the absolute value of the crossover point is exceedingly high and can be as much as 20 megohms. It will be further appreciated that because of this high crossover point, both the P-channel and N-channel devices are operating on steep portions of their resistance curves. Not only does this tend to increase the "on" resistance of the switching device in general, it also increases the rate of change of the resistance through the device as a function of the input voltage. By reducing the point at which these two curves crossover, both the resistance of the device is decreased and the rate of change of the resistance through the device is also decreased. The composite resistance characteristic of the standard C-MOS device is derived from the P-channel resistance curve 31 and the N-channel resistance curve 43 as shown by the curve 44 labeled R. As can be seen from the curve 44, there is a distinct slope to the curve at the zero input voltage or crossover point. It is this characteristic which is to be avoided so that the switch can faithfully transmit low amplitude signals without "distortion."

Referring to FIG. 5 as can be seen at the right-hand side of the graph, the same two MOS devices 40 and 41 of FIG. 4 are provided with the aforementioned additional P-type device 50 which permits the clamping of the N-channel substrate to its source thereby removing from the equation (1) much of the significance of the $V_T$ term with respect to the resistance change. As a result, $R_N$ becomes proportional to $1/V_{sg_n}$. The provision of P-channel device 50 does not change the characteristic of the P-channel device 40 such that its resistance in FIG. 5 is again given by the curve 31. However, the steep slope of the curve 43 in FIG. 4 has been lessened so that the $R_N$ curve 51 now intersects curve 31 at a point equal to approximately 670 ohms. By proper geometric configuring of the P-channel and N-channel devices and/or by providing the P-channel device with its own source-to-substrate short, the symmetry shown in FIG. 5 can be achieved. However, this symmetry is not essential to the substantially linear operation of the analog switch. What is significant is that the resistance through the N-channel device is reduced such that the overlap of the $R_N$ and the $R_P$ curves occurs very much lower than is the case without the use of transistor 50 or without connecting the substrate to the source of the N-channel device. What results is a combined input-output resistance characteristic shown by the line 55 which instead of having a sharp slope at the zero input voltage level, now has almost no slope or a zero slope. Even if the crossover of the $R_N$ and the $R_P$ characteristics is not centered with respect to the zero voltage line, this slight off-centering will make very little difference, because of the relatively shallow curve between the points 56 and 57, at least as to small signal level input signals.

Figure 6:
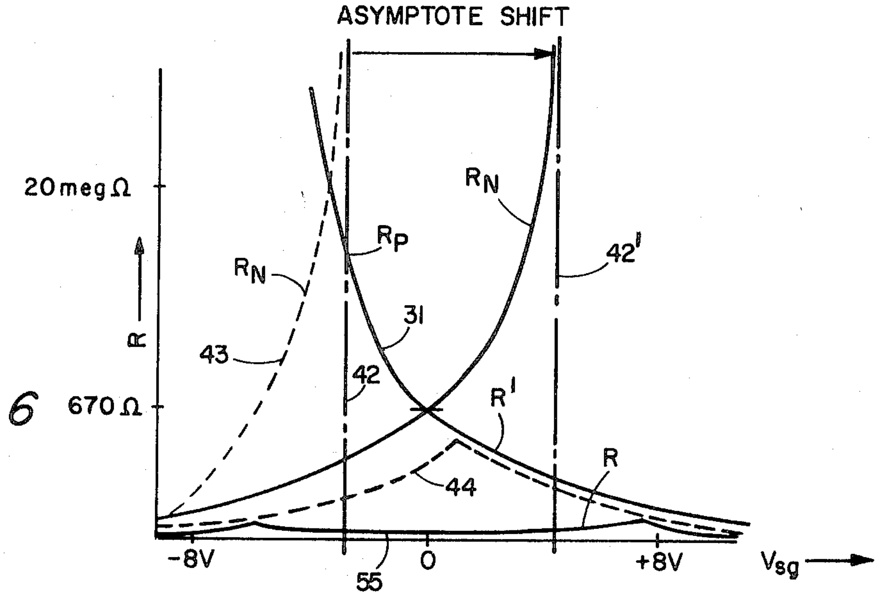
FIG. 6 shows a super-positioning of the graph shown in FIG. 5 over the graph shown in FIG. 4 so as to compare the resistance characteristics of the standard device with the subject device.

Referring to FIG. 6, a composite of FIGS. 4 and 5 are shown so that the effect of adding the auxiliary or additional P-channel device can be more fully understood. Herein the lines of the graph in FIG. 6 are labeled with numbers corresponding to the numbers shown in FIGS. 4 and 5. As can be seen, by coupling the substrate to the source of the N-channel device, the asymptote 42 of the curve representing the resistance through the N-channel device has been shifted to the right of the graph as shown by the dotted line 42. What this corresponds to physically is an increase in the voltage at which the N-channel device turns "off."

It will be appreciated that if the output of the subject analog switching device sees a high impedance at its output, that the auxiliary P-channel device may run between the drain of the N-channel device and its substrate. It will be further appreciated that if the P-channel device is made in an N-type tube in a P-type substrate, that everything is reversed in that the gate will now have one P-channel device and two N-channel devices with the auxiliary device being an N-channel device coupled between the source and substrate of the P-channel device and with the gate of the auxiliary device then being coupled to the original N-channel device gate.

INTEGRATED CIRCUIT FABRICATION

Figure 8:
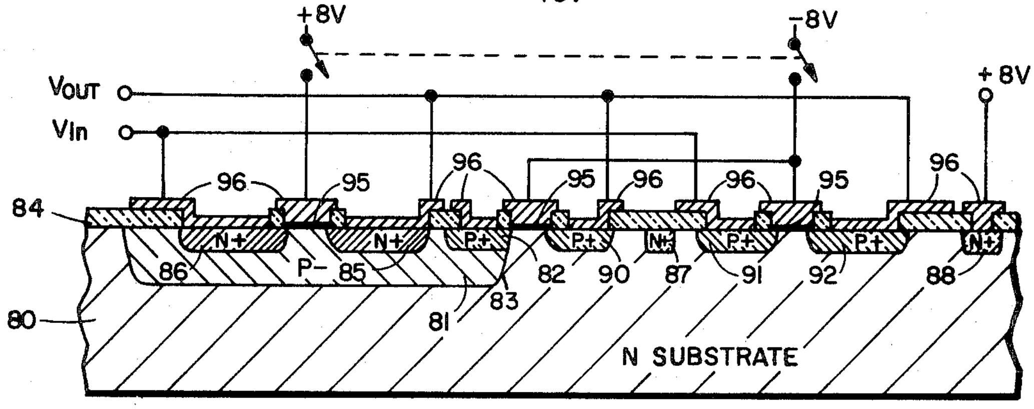
FIG. 8 is a cross-sectional representation of the completed C-MOS analog switching device utilizing the additional P-channel device as a means for maintaining the substrate-source voltage differential $V_{s\text{-}sub}$ equal to zero.

As mentioned hereinbefore, it is the integrated circuit fabrication of the complementary MOS structure which gives rise to the increased sensitivity of the N-channel device since the N-channel device is made in a P-pot having a higher impurity concentration than the N-type substrate which is used as a substrate for the P-channel devices. What is not clear from the schematic diagrams described hereinbefore is that the subject device can be made in precisely the same manner as the standard complementary MOS devices with no additional diffusion steps. A cross-section of the subject device is shown in FIG. 8 to have an N-type substrate 80 into which is diffused a P-type tub 81. The doping concentration in the N-type substrate is typically $2 \times 10^{15}$ atoms/cm$^3$ with a doping concentration in the P-tub 81 being on the order of $2 \times 10^{16}$ atoms/cm$^3$. It will be appreciated that a portion of the tub 81 serves as an element of the additional P-channel device although strict border registration such as that shown between the source of the P-channel device 82 and the edge 83 of the tub 81 is not critical or necessary. The ability to form a portion of the auxiliary P-channel device as part of the N-channel device yields the obvious savings in space on the semiconductor chip. It will be assumed that appropriate masking and etching of a dielectric layer 84 is accomplished before each of the following diffusion steps:

The first of the diffusion steps involves an $N^+$ doping which results in the source and drain regions 85 and 86 for the N-channel device, an $N^+$ barrier region 87 and an $N^+$ enhanced contact region 88 for the N-substrate 80. Regions 85, 86, 87 and 88 are simultaneously diffused into the appropriate portions of the substrate to approximately equal depths. Thereafter, the $P^+$ regions 82, 90, 91 and 92 are diffused into the appropriate regions of the substrate with the regions 82 and 90 being the source and drain for the auxiliary P-channel device and the regions 91 and 92 being the source and drain for the "original" P-channel device. It will be appreciated that the region 82 serves both as a contact to the P-tub 81 as well as being an element of the auxiliary P-channel device. This region 82 is normally existing in C-MOS standard processing. The only additional regions over which the mask must be opened up is region 90, thus adding only a very small additional step to already known processing techniques. After the diffusion of the aforementioned regions, the device is masked and opened up over the gate regions of the three MOS devices shown diagrammatically at 95. The gate oxides are deposited in any conventional manner. Thereafter, the metallization for the device is deposited and patterned as shown by the reference characters 96. The external connections to the $V_{in}$ and $V_{out}$ terminals are as shown. It will be noted that in this configuration the auxiliary P-channel device is connected to the gate of the original P-channel device and that the source of the auxiliary P-channel device is automatically connected to the substrate of the N-channel device with the contact thereabove being left open or omitted. The drain of the auxiliary P-channel device is shown connected to the $V_{out}$ terminal of the device although in most configurations it could equally well be connected to the $V_{in}$ terminal. Thus will be appreciated the relative ease of fabrication of the additional auxiliary P-channel device under existing processing techniques.

Figure 9:
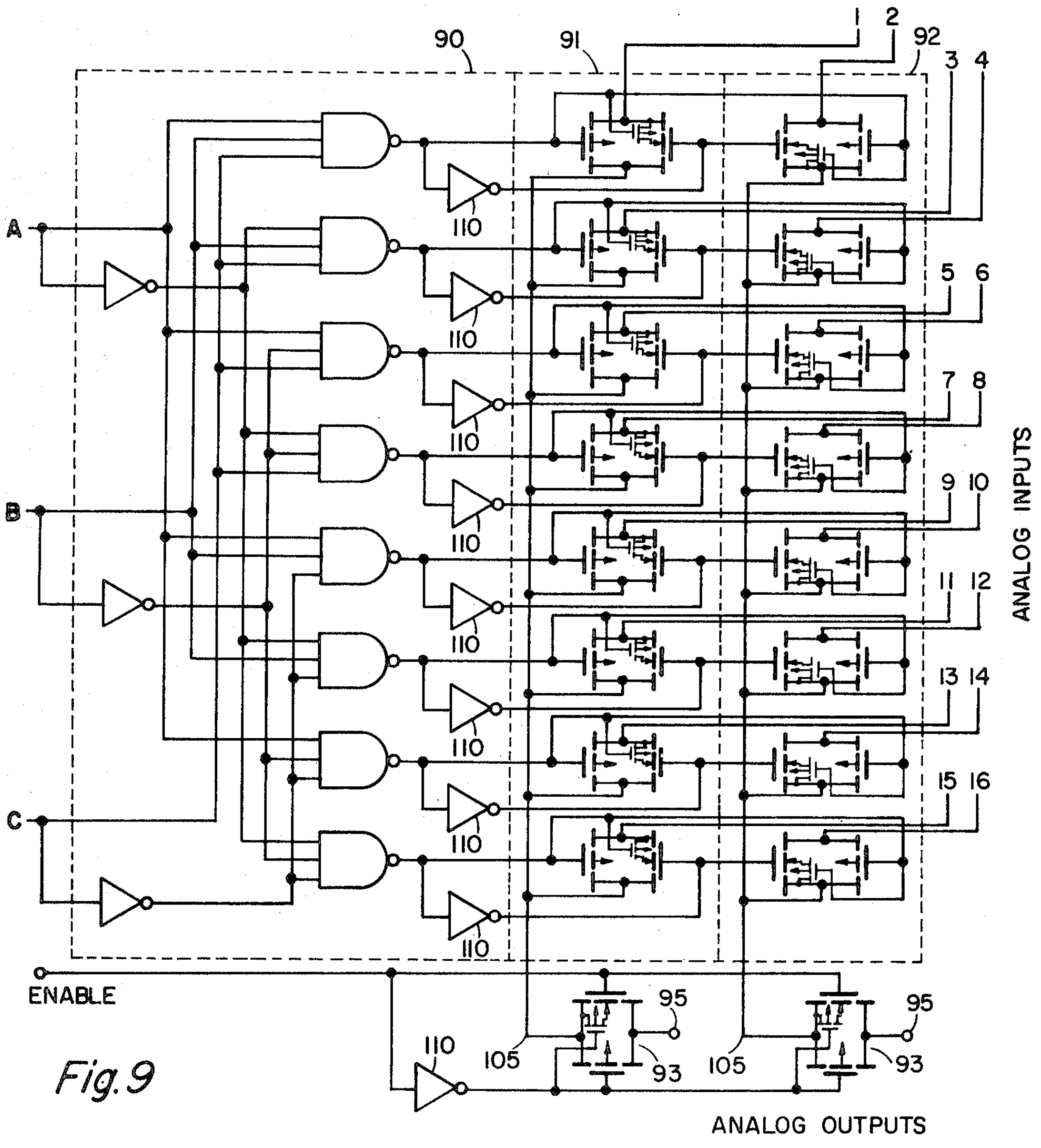
FIG. 9 shows the application of the subject analog switch in a differential eight-channel multiplex switch.

Referring now to FIG. 9, the use of the subject C-MOS analog switch is shown in a differential eight-channel multiplex switching circuit which consists of a standard three input decoder circuit shown in dotted box 90 which selects one of eight switches in each of two banks 91 and 92 to provide two-wire switch multiplex capability for the best common mode noise rejection. Enable switches 93 are also included in series with the decoded switch banks to reduce loading capacitance and cross-talk. It will be appreciated that input signals on the pairs of lines 1, 2; 3, 4; 5, 6; 7, 8; 9, 10; 11, 12; 13, 14; and 15, 16 are switched by the decoding circuit 90 in response to the presence or absence of signals at points A, B and C such that only one pair of transmission input lines is coupled to the analog output at 95.

Figure 10:
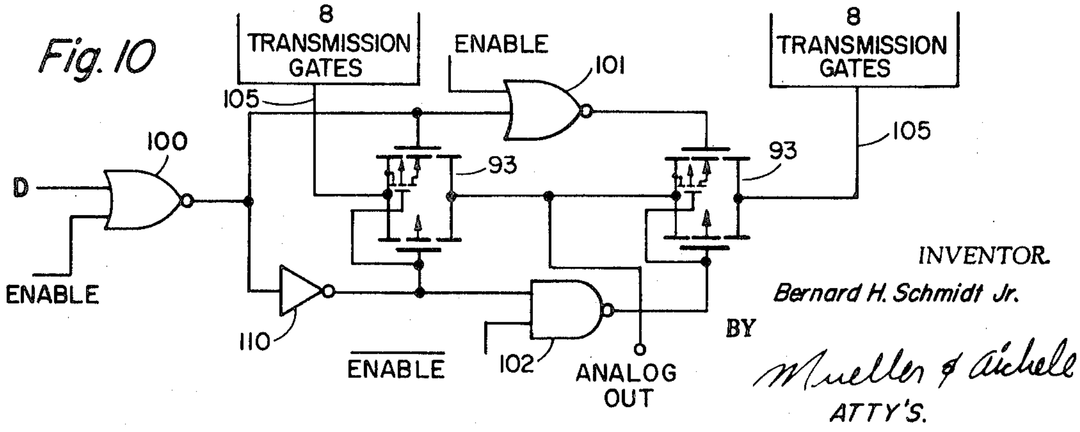
FIG. 10 shows the utilization of the subject analog switch in a single 16-channel multiplexing application.

Referring now to FIG. 10, the differential eight-channel multiplexing switching circuit described with respect to FIG. 9 can be modified to perform the single 16-channel function as indicated. Input gates 100, 101 and 102, each having two inputs, can be included on the chip housing the circuit shown in FIG. 9 to complete the modification with very little additional remetallization such that the inputs to the switches 93 shown at 105 are the lines 105 shown in FIG. 10 with the switches 93 being connected up as shown to the three additional gates 100, 101 and 102. It will be appreciated that the inverting circuits 110 throughout the FIGS. 9 and 10 are necessary to provide the reverse polarity gating pulse to the other of the MOS devices in the C-MOS package. The examples shown in FIGS. 9 and 10 are merely illustrative of one of the many types of multiplexing circuits in which the subject analog switching devices can be utilized. Additionally, the circuits shown in FIG. 10 can in fact become a single eight-channel switch, or a two of eight multiplex switch can be made by merely altering the wire bonding diagram.

SUMMARY

The basic concept which makes possible the use of solid-state relays of the C-MOS configuration is the idea that the non-linearity of the resistance through the device is in part due to the variability of the gating threshold for the metal oxide semiconductor device. The variability of the gating threshold can be controlled by shorting a portion of the MOS substrate to its source or drain. This permits the MOS to operate on a flatter portion of its input-output resistance curve which in turn linearizes the resistance characteristic of the device. This can be applied to single MOS devices as well as the parallel-connected C-MOS configuration described herein.

A further and most important feature of this invention is that the connection between the substrate and the source of an individual MOS device is made through a further MOS device which is rendered conductive only during those periods of time that the original MOS device is to be rendered conductive. This can be done in one of several ways. When the parallel-connected configuration is utilized as the solid-state relay, then merely connecting the gate of the auxiliary MOS device to the gate of a similar type MOS device provides the needed function. Alternately, a simple inverting circuit can be utilized such that the connection between the original MOS device and the auxiliary MOS device goes through this inverter. While the subject technique is only one of many ways of causing a MOS device to operate on a more linear portion of its resistance curve, it is an important concept in integrated circuit fabrication because control of the other parameters which would cause such a linear response is all but impossible. Thus a standard processing technique may be used for fabrication of the subject C-MOS devices to provide a linear nanosecond analog switch.

What is claimed is:

1. A solid-state switching device comprising:

two complementary metal oxide semiconductor field-effect transistors, the first of said transistors being a P-channel device having source and drain regions and the second of said transistors being an N-channel device having source and drain regions, the source and drain regions of different transistors being interconnected such that said transistors are connected in parallel, each of said transistors having a gate; and means for selectively shorting the substrate of one of said transistors to its source region whenever both of said transistors are rendered conducting by the simultaneous application of gating signals of appropriate amplitudes and polarities to the gates of said devices, whereby the variation of the resistance across said solid-state device, when both of said transistors are conducting is minimized with respect to variations in a signal applied to one of the interconnected source and drain regions.

2. The switching device as recited in claim 1 wherein the substrate of one of said transistors is formed in the substrate of the other of said transistors, the substrate formed in the substrate of the other transistor being that substrate which is connected to its own source region by said means, whereby the sensitivity to input signals of the device associated with the substrate formed in the substrate of said other transistor is diminished.

3. The switching device as recited in claim 2 wherein said means includes an additional solid-state switching device serially connected between said substrate formed in a substrate and the source region associated with said substrate formed in a substrate, said switching device being rendered conductive by the presence of one of said gating signals so as to connect the substrate formed in a substrate to the source region associated therewith.

4. The switching device recited in claim 3 wherein said additional switching device is a metal oxide semiconductor field-effect transistor of the same type as that transistor into whose substrate a substrate is formed, the gate of said additional switching device and that of the transistor into whose substrate a substrate is formed being interconnected.

5. A solid-state switching device comprising:

a metal oxide semiconductor field-effect transistor having a source region adapted to receive an input signal, a drain region, and a gate adapted to receive a gating signal which renders said transistor conducting such that said input signal is available at said drain region whenever said transistor is rendered conductive; and means for selectively shorting the substrate of said transistor to said source region whenever said transistor is rendered conducting, whereby the change in resistance across said transistor with respect to changes in the amplitude of said input signal is minimized such that distortion of said input signal at said drain region is also minimized.

6. The solid-state switching device is recited in claim 5 wherein said means includes an additional solid-state switching device coupled between the substrate of said transistor and said source region, said additional switching means being rendered conductive simultaneously with said transistor.

7. The solid-state switching device as recited in claim 6 wherein said additional solid-state switching device is a metal oxide semiconductor field-effect transistor.

8. The solid-state switching device as recited in claim 7 wherein said additional metal oxide semiconductor is of a type opposite to that of said first mentioned field-effect transistor, said additional solid-state switching device being rendered conductive simultaneously with said first mentioned transistor.

9. A solid-state switching device comprising:

a block of semiconductive material of a first conductivity type having a top surface;

a tub of semiconductive material of an opposite conductivity type to that of said block, within said block and extending downwardly from said top surface in one region of said block, said tub having a surface coplanar with that of said block;

first source and drain regions extending into said tub from a top surface thereof said first source and drain regions being of said first conductivity type;

a first gate layer on the surface of said tub and overlying portions of said first source and drain regions, said first gate layer being of an insulating material;

second source and drain regions extending into said block from the top surface thereof and spaced from said tub, said second source and drain regions being of said opposite conductivity type;

a second gate layer on the top surface of said block and overlying portions of said second source and drain regions, said second gate layer being formed from an insulating material;

third source and drain regions of said opposite conductivity type extending into said block from the top surface thereof;

a third gate layer overlying portions of said third source and drain regions;

patterned metallization over the top surface of said device, said metallization forming contacts to said source and drain regions and said gate layers, the impurity concentration in said block, said tub and each of said source and drain regions being such that the devices formed by said structures are enhancement mode devices;

means for connecting said first source region to said second drain region, said means also forming an input terminal for said solid-state switch means for connecting said second source region to said first drain region, said last mentioned means also forming an output terminal for said solid-state switch;

means for connecting said third gate layer to said second gate layer;

means for connecting said third drain region to said output terminal;

means for connecting said third source region to said tub;

isolating means between said second source and drain regions and said first and third source and drain regions;

means adapted to receive a biasing voltage for contacting said block; and means for applying appropriate polarity gating signals to said first and second gate layers to render said switching device conductive whereby whenever said gating signals and bias voltage are applied, any input signal at said input terminal will be transmitted through said switching device to said output terminal with a minimum of distortion.

10. The switching device as recited in claim 9 wherein said connecting means are provided by said patterned metallization.

11. A solid-state switching device comprising:

a block of semiconductive material of a first conductivity type having a top surface;

a tub of semiconductive material of an opposite conductivity type to that of said block, within said block and extending downwardly from said top surface in one region of said block, said tub having a surface coplanar with that of said block;

first source and drain regions extending into said tub from a top surface thereof, said first source and drain regions being of said first conductivity type;

a first gate layer on the surface of said tub and overlying portions of said first source and drain regions, said first gate layer being of an insulating material;

second source and drain regions extending into said block from the top surface thereof and spaced from said tub, said second source and drain regions being of said opposite conductivity type;

a second gate layer on the top surface of said block and overlying portions of said second source and drain regions, said second gate layer being formed from an insulating material;

third source and drain regions of said opposite conductivity type, said third drain region extending into said block from the top surface thereof, said third source region extending into said tub from the top surface thereof;

a third gate layer overlying portions of said third source and drain regions;

patterned metallization over the top surface of said device, said metallization forming contacts to said source and drain regions and said gate layers, the impurity concentration in said block, said tub and each of said source and drain regions being such that the devices formed by said structures are enhancement mode devices;

means for connecting said first source region to said second drain region, said means also forming an input terminal for said solid-state switch;

means for connecting said second source region to said first drain region, said means also forming an output terminal for said solid-state switch;

means for connecting said third gate layer to said second gate layer;

means for connecting said third drain region to said output terminal;

isolating means between said second source and drain regions and said first and third source and drain regions;

means adapted to receive a biasing voltage for contacting said block; and means for applying appropriate polarity gating signals to said first and second gate layers to render said switching device conductive whereby whenever said gating signals and bias voltage are applied, any input signal at said input terminal will be transmitted through said switching device to said output terminal with a minimum of distortion.

12. A solid-state switching device comprising:

a block of semiconductive material of a first conductivity type having a top surface;

a tub of semiconductive material of an opposite conductivity type to that of said block, within said block and extending downwardly from said top surface in one region of said block, said tub having a surface co-planar with that of said block;

first source and drain regions extending into said tub from a top surface thereof, said first source and drain regions being of said first conductivity type;

a first gate layer on the surface of said tub and overlying portions of said first source and drain regions, said first gate layer being of an insulating material;

second source and drain regions extending into said block from the top surface thereof and spaced from said tub, said second source and drain regions being of said opposite conductivity type;

a second gate layer on the top surface of said block and overlying portions of said second source and drain regions, said second gate layer being formed from an insulating material;

third source and drain regions of said opposite conductivity type extending into said block from the top surface thereof;

a third gate layer overlying portions of said third source and drain regions;

patterned metalization over the top surface of said device, said metalization forming contacts to said source and drain regions and said gate layers, the impurity concentration in said block, said tub and each of said source and drain regions being such that the devices formed by said structures are enhancement mode devices;

means for connecting said first source region to said second drain region, said means also forming an input terminal for said solid-state switch;

means for connecting said second source region to said first drain region, said last-mentioned means also forming an output terminal for said solid-state switch;

means for connecting said third gate layer to said second gate layer;

means for connecting said third drain region to said input terminal;

means for connecting said third source region to said tub;

isolating means between said second source and drain regions and said first and third source and drain regions;

means adapted to receive a biasing voltage for contacting said block; and means for applying appropriate polarity gating signals to said first and second gate layers to render said switching device conductive whereby whenever said gating signals and bias voltage are applied, any input signal at said input terminal will be transmitted through said switching device to said output terminal with a minimum of distortion.

13. A solid-state switching device comprising:

a block of semiconductive material of a first conductivity type having a top surface;

a tub of semiconductive material of an opposite conductivity type to that of said block, within said block and extending downwardly from said top surface in one region of said block, said tub having a surface co-planar with that of said block;

first source and drain regions extending into said tub from a top surface thereof, said first source and drain regions being of said first conductivity type;

a first gate layer on the surface of said tub and overlying portions of said first source and drain regions, said first gate layer being of an insulating material;

second source and drain regions extending into said block from the top surface thereof and spaced from said tub, said second source and drain regions being of said opposite conductivity type;

a second gate layer on the top surface of said block and overlying portions of said second source and drain regions, said second gate layer being formed from an insulating material;

third source and drain regions of said opposite conductivity type, said third drain region extending into said block from the top surface thereof, said third source region extending into said tub from the top surface thereof;

a third gate layer overlying portions of said third source and drain regions:

patterned metalization over the top surface of said device, said metalization forming contacts to said source and drain regions and said gate layers, the impurity concentration in said block, said tub and each of said source and drain regions being such that the devices formed by said structures are enhancement mode devices:

means for connecting said first source region to said second drain region, said means also forming an input terminal for said solid-state means for connecting said second source region to said first drain region, said means also forming an output terminal for said solid-state switch;

means for connecting said third gate layer to said second gate layer;

means for connecting said third drain region to said input terminal;

isolating means between said second source and drain regions and said first and third source and drain regions;

means adapted to receive a biasing voltage for contacting said block; and means for applying appropriate polarity gating signals to said first and second gate layers to render said switching device conductive whereby whenever said gating signals and bias voltage are applied, any input signal at said input terminal will be transmitted through said switching device to said output terminal with a minimum of distortion.

* * * * *